US010302432B2

(12) United States Patent
Hughes

(10) Patent No.: US 10,302,432 B2
(45) Date of Patent: May 28, 2019

(54) COMPENSATING CIRCUIT FOR A MICROELECTROMECHANICAL (MEMS) RESONATOR

(71) Applicant: InvenSense, Inc., San Jose, CA (US)

(72) Inventor: Kevin Hughes, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 440 days.

(21) Appl. No.: 15/134,131

(22) Filed: Apr. 20, 2016

(65) Prior Publication Data

US 2017/0307374 A1    Oct. 26, 2017

(51) Int. Cl.
*G01C 19/00* (2013.01)
*G01C 19/5712* (2012.01)
*G01C 19/5776* (2012.01)

(52) U.S. Cl.
CPC ..... *G01C 19/5712* (2013.01); *G01C 19/5776* (2013.01)

(58) Field of Classification Search
CPC ............ G01C 19/5712; G01C 19/5776; G01C 19/5726
USPC ....................................... 73/504.12; 702/127
See application file for complete search history.

(56) References Cited

U.S. PATENT DOCUMENTS

| 6,079,272 A * | 6/2000 | Stell ................... G01C 19/5649 73/504.12 |
| 2005/0256659 A1 | 11/2005 | Malvern et al. |
| 2011/0167891 A1 | 7/2011 | Geen |

OTHER PUBLICATIONS

Extended European Search Report for European Application No. 17167255.3, 7 pages, dated Sep. 14, 2017 (Sep. 14, 2017).
Zhao, et al., "The research on the performance of the Micromachined gyroscope at low ambient pressure", 3rd International Conference on Sensing Technology, Nov. 30-Dec. 3, 2008, IEEE, Nov. 30, 2008, 21-24.
Eminoglu, et al., "Background Calibrated MEMS Gyroscope", Sensors, 2014 IEEE, Nov. 2014, 922-925.

* cited by examiner

*Primary Examiner* — Leslie J Evanisko

(57) ABSTRACT

A circuit comprising a microelectromechanical (MEMS) gyroscope and a gain circuit coupled with the MEMS gyroscope. The gain circuit is configured to receive a digitized drive signal based at least in part on a digitized drive voltage amplitude of the MEMS gyroscope. The gain circuit is also configured to determine a percentage change in quality factor of the MEMS gyroscope based at least in part on the digitized drive signal and a stored trim value of the MEMS gyroscope. The gain circuit is also configured to compensate for an effect of a change in the quality factor of the MEMS gyroscope based at least in part on the percentage change in quality factor.

21 Claims, 8 Drawing Sheets

700

```
┌─────────────────────────────────────────────────────────────────┐
│  RECEIVE A DIGITIZED DRIVE VOLTAGE AMPLITUDE OF A MEMS GYROSCOPE │
│                              705                                │
└─────────────────────────────────────────────────────────────────┘
                                │
                                ▼
┌─────────────────────────────────────────────────────────────────┐
│  DETERMINE A PERCENTAGE CHANGE IN QUALITY FACTOR BASED ON THE   │
│   DIGITIZED DRIVE VOLTAGE AMPLITUDE AND AN INITIAL DIGITIZED    │
│   DRIVE VOLTAGE AMPLITUDE OF THE MEMS GYROSCOPE, WHEREIN THE    │
│   INITIAL DIGITIZED DRIVE VOLTAGE AMPLITUDE OF THE MEMS         │
│            GYROSCOPE IS THE STORED TRIM VALUE                   │
│                              710                                │
└─────────────────────────────────────────────────────────────────┘
                                │
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  CALCULATE AN OFFSET MAGNITUDE BASED ON A SCALE FACTOR AND THE  │
│             PERCENTAGE CHANGE IN QUALITY FACTOR                 │
│                              715                                │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
                                ▼
┌─────────────────────────────────────────────────────────────────┐
│  COMPENSATE FOR AN EFFECT OF THE CHANGE IN THE QUALITY FACTOR   │
│   OF THE MEMS GYROSCOPE BASED AT LEAST IN PART ON THE           │
│              PERCENTAGE CHANGE IN QUALITY FACTOR                │
│                              720                                │
└─────────────────────────────────────────────────────────────────┘
```

ADD AN OFFSET MAGNITUDE TO A SENSE PATH OF THE MEMS GYROSCOPE, WHEREIN THE OFFSET MAGNITUDE IS BASED ON THE PERCENTAGE CHANGE IN QUALITY FACTOR AND A SCALE FACTOR
805

PROVIDE THE PERCENTAGE CHANGE IN QUALITY FACTOR TO A DEMODULATOR
905

ADJUST A PHASE OF THE DEMODULATOR BASED ON THE PERCENTAGE CHANGE IN QUALITY FACTOR
910

COMPENSATING CIRCUIT FOR A MICROELECTROMECHANICAL (MEMS) RESONATOR

BACKGROUND

Fluctuations and changes in various conditions, such as temperature or outgassing/ingassing, can result in pressure changes in the cavity of a microelectromechanical (MEMS) resonator, such as a MEMS gyroscope. These pressure changes can change the quality factor (also referred to as "Q factor") of the MEMS resonator, resulting in a change in the zero-rate offset of the MEMS resonator. Even a small percentage change in quality factor can impact the zero-rate offset. The zero-rate offset in frequency-mismatched MEMS resonators is related to the deviation of the phase difference between the Coriolis and quadrature signals from 90° (phase error).

SUMMARY

A circuit comprising a microelectromechanical (MEMS) gyroscope and a gain circuit coupled with the MEMS gyroscope. The gain circuit is configured to receive a digitized drive signal based at least in part on a digitized drive voltage amplitude of the MEMS gyroscope. The gain circuit is also configured to determine a percentage change in quality factor of the MEMS gyroscope based at least in part on the digitized drive signal and a stored trim value of the MEMS gyroscope. The gain circuit is also configured to compensate for an effect of a change in the quality factor of the MEMS gyroscope based at least in part on the percentage change in quality factor.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 7 illustrates a flow diagram of a method for open-loop compensation of a MEMS gyroscope in which a drive amplitude is used.

FIG. 8 illustrates a flow diagram of a method for adding an offset magnitude to a sense path of a MEMS gyroscope, according to some embodiments.

FIG. 9 illustrates a flow diagram of a method for adjusting a phase of a demodulator, according to some embodiments.

DESCRIPTION OF EMBODIMENTS

Figure 1:
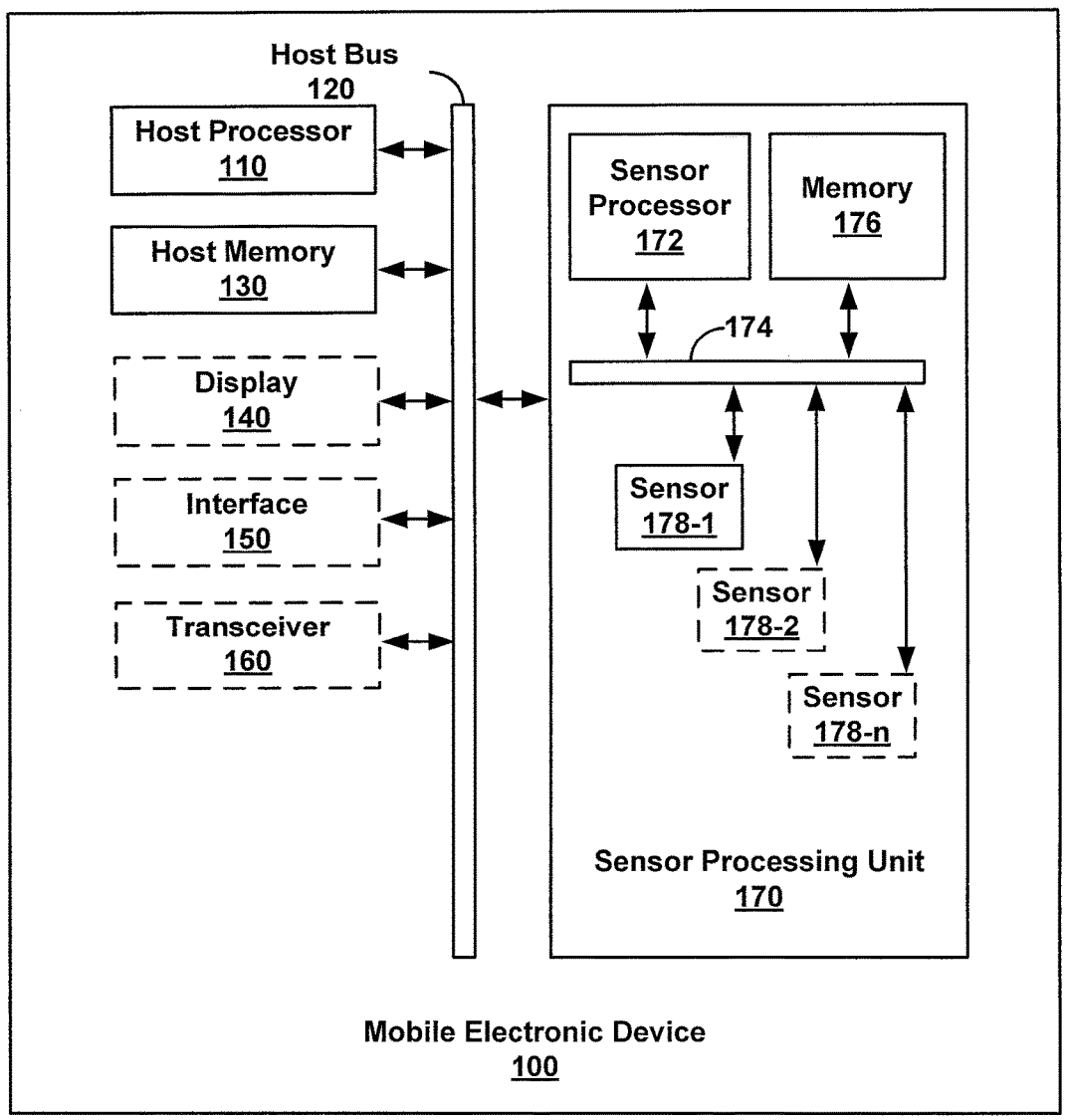
FIG. 1 is a block diagram of an example mobile electronic device 100 upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "compensating," "calculating," "adding," "providing," "adjusting," or the like, refer to the actions and processes of an electronic device such as an electrical circuit.

Overview of Discussion

Discussion begins with a description of an example mobile electronic device with which or upon which various embodiments described herein may be implemented. Example circuits for providing offset compensation of a microelectromechanical (MEMS) resonator are then described. Operation of the example circuits are further described in conjunction with description of examples method of open-loop compensation of a MEMS gyroscope.

Example Mobile Electronic Device

Turning now to the figures, FIG. 1 is a block diagram of an example mobile electronic device 100. As will be appreciated, mobile electronic device 100 may be implemented as a device or apparatus, such as a handheld mobile electronic device, that can be moved in space by, for example, a human user, a mechanical device, or electrical device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices.

As depicted in FIG. 1, mobile electronic device 100 may include a host processor 110, a host bus 120, a host memory 130, and a sensor processing unit 170. Some embodiments of mobile electronic device 100 may further include one or more of a display 140, an interface 150, a transceiver 160 (all depicted in dashed lines) and/or other components. In various embodiments, electrical power for mobile electronic device 100 is provided by a mobile power source such as a battery, when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of mobile electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit 170, and other components of mobile electronic device 100 may be coupled communicatively through host bus 120 in order to exchange commands and data. Depending on the architecture, different bus configurations may be employed as desired. For example, additional buses may be used to couple the various components of mobile electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Mobile electronic device 100 also includes a general purpose sensor assembly in the form of integrated sensor processing unit (SPU) 170 which includes sensor processor 172, memory 176, at least one sensor 178 (178-1, 178-2, . . . 178-$n$), and a bus 174 for facilitating communication between these and other components of sensor processing unit 170. In some embodiments, all of the components illustrated in sensor processing unit 170 may be embodied on a single integrated circuit. It should be appreciated that sensor processing unit 170 may be manufactured as a stand-alone unit (e.g., an integrated circuit), that may exist separately from a larger electronic device.

Sensor processor 172 can be one or more microprocessors, CPUs, DSPs, general purpose microprocessors, ASICs, ASIPs, FPGAs or other processors which run software programs, which may be stored in memory 176, associated with the functions of sensor processing unit 170.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of sensor processing unit 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from one or more sensors 178, as well as the received data either in its raw form or after some processing. Such algorithms and routines may be implemented by sensor processor 172 and/or by logic or processing capabilities included in sensor 178.

A sensor 178 may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In one example, sensor 178-1 may comprise an acoustic sensor, sensor 178-2 may comprise a second acoustic sensor, and sensor 178-n may comprise a motion sensor.

In some embodiments, one or more sensors 178 may be implemented using a microelectromechanical system (MEMS) that is integrated with sensor processor 172 and one or more other components of SPU 170 in a single chip or package.

Although depicted as being included within sensor processing unit 170, one, some, or all sensors 178 may be disposed externally to sensor processing unit 170 in various embodiments.

Example Circuit with Offset Compensation Using Drive Ratio

Figure 2:
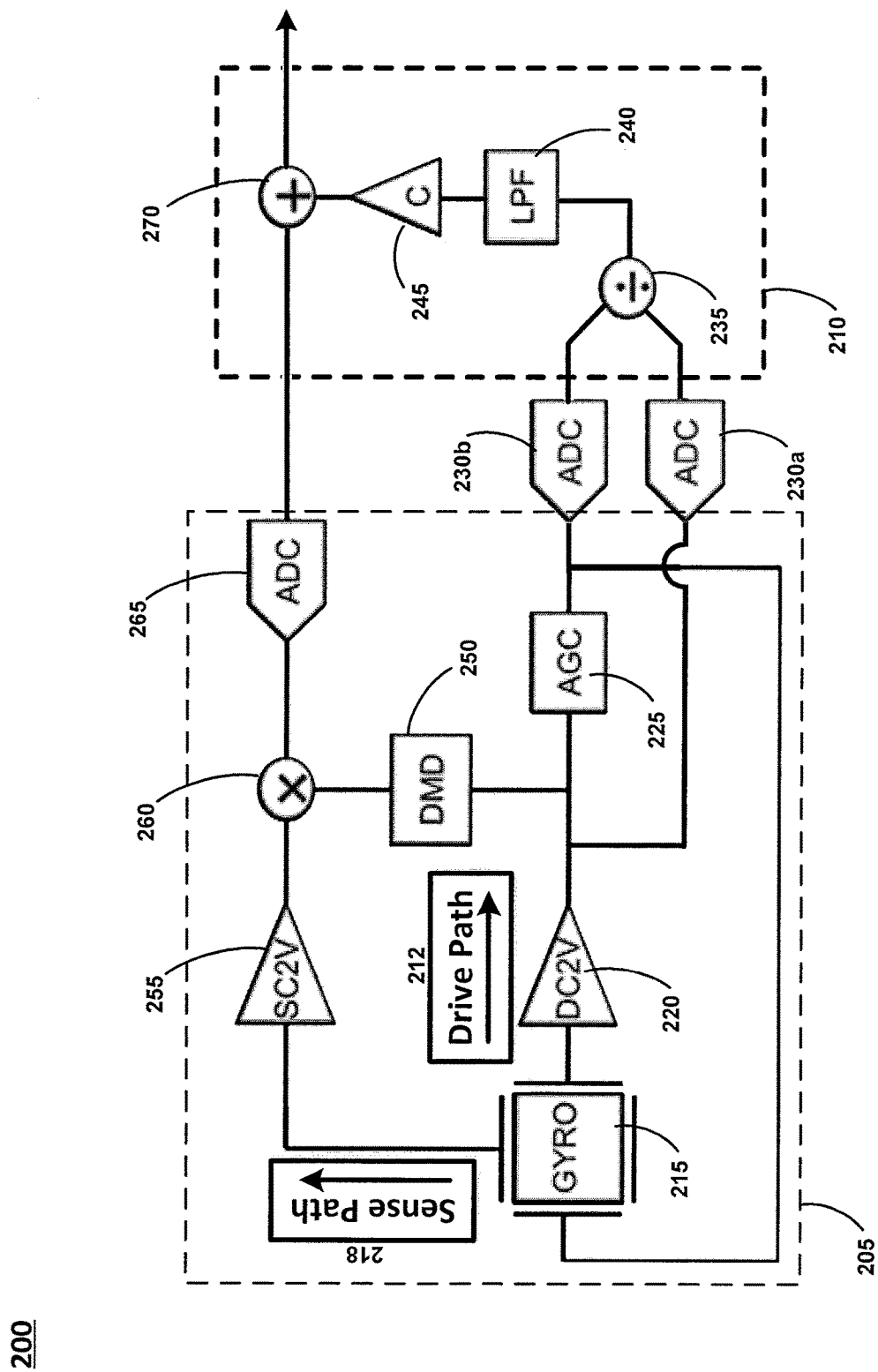
FIG. 2 illustrates a block diagram of example circuit with offset compensation using drive ratio, according to some embodiments.

FIG. 2 illustrates a block diagram of example circuit 200 with offset compensation using drive ratio, according to some embodiments. For example, sensor processing unit 170 of FIG. 1, may include circuit 200 as a sensor 178 (e.g., sensor 178-1 may be a circuit 200). As illustrated in FIG. 2, circuit 200 includes a MEMS gyroscope circuit 205 and a drive ratio offset compensation circuit 210.

In various embodiments, MEMS gyroscope circuit 205 is configured to provide multiple axis gyroscopic sensing for use in a variety of applications using angular motion. For example, various portable electronic devices, such as those configured to be handheld or otherwise associated with a user, are employed in a wide variety of applications and environments. The ubiquity of devices such as mobile phones, smart phones, and other similar devices indicates the popularity and desire for these types of devices. Increasingly, such devices are equipped with one or more sensors or other systems for determining the position or motion of the portable device, including inertial navigation techniques based upon the integration of specific forces and angular rates as measured by inertial sensors (e.g. accelerometers, gyroscopes). While embodiments herein are described using a MEMS gyroscope, it should be appreciated that other MEMS resonators, such as MEMS oscillators, MEMS accelerometers, and other MEMS timing components, may also be used.

As described herein, MEMS gyroscope 215 is configured to provide a sense signal over sense path 218 and drive signal over drive path 212. Using measurements of the components in drive path 212, a change in quality factor of MEMS gyroscope 215 can be estimated. This estimated change in quality factor can be used to compensate for offset change by digitally modifying the signal in sense path 218.

Quality factor is a measure of energy in to an oscillator (e.g., MEMS gyroscope 215) to the energy out, and provides the damping characteristics of the oscillator. For instance, as damping of an oscillator increases (e.g., due to temperature changes or internal cavity pressure changes) the quality factor of the oscillator will reduce. By determining the change in quality factor, the final output of the oscillator can be adjusted to account for effect of the change in quality factor. For example, the effects of the change in quality factor can be nulled out by offsetting the output signal of the oscillator.

MEMS gyroscope 215 is coupled with drive-sense amplifier (DC2V) 220, and provides a gyroscope drive signal (e.g., the drive output) to drive-sense amplifier 220. MEMS gyroscope 215 maintains an oscillation, and drive-sense amplifier 220 is configured to sense the amplitude of the oscillation of MEMS gyroscope 215. The output signal from drive-sense amplifier 220 is also referred to herein as the drive output The output of drive-sense amplifier 220 is coupled to amplitude gain control (AGC) 225, analog to digital converter (ADC) 230a, and demodulator 250. Amplitude gain control 225 receives the drive output from drive-sense amplifier 220, and outputs a drive input signal, also referred to herein as the drive voltage. The drive input signal is fed back into MEMS gyroscope 215, in maintaining oscillation, and is fed into analog to digital converter 230b.

As described herein, analog to digital converters 230a and 230b receive a drive output signal and a drive input signal, respectively. However, it should be appreciated that a single analog to digital converter can be used for receiving and digitizing the drive input signal and the drive output signal by multiplexing the signals. Accordingly, the operations of analog to digital converters 230a and 230b may refer to the multiplexed operations of a single analog to digital converter. Analog to digital converter 230a is configured to digitize the drive output signal and analog to digital converter 230b is configured to digitize the drive input signal.

Divider circuit 235 is coupled to analog to digital converters 230a and 230b, and is configured to calculate a ratio of the digitized drive input signal to the digitized drive output signal, resulting in the drive ratio. The drive ratio provides an estimation of the quality factor of MEMS gyroscope 215. In one embodiment, the drive ratio is calculated according to equation (1), as follows:

$$\text{Drive Ratio} = \frac{\text{Drive Input}}{\text{Drive Output}} \quad (1)$$

Where the Drive Input is the digitized drive input signal and the Drive Output is the digitized drive output signal.

In one embodiment, the drive ratio signal is passed through low pass filter 240 to minimize signal noise of the drive ratio signal.

Gain circuit 245 is configured to receive a digitized drive signal based at least in part on a digitized drive voltage amplitude of the MEMS gyroscope. Gain circuit 245 receives the drive ratio signal, and is configured to calculate a quality factor ratio of the drive ratio received from divider circuit 235 to a stored drive ratio of MEMS gyroscope 215. The quality factor ratio is indicative of a percentage change in a quality factor of MEMS gyroscope 215. In one embodiment, the stored drive ratio is a trim value (e.g., an initial drive ratio) determined upon fabrication of MEMS gyroscope 215. It should be appreciated that the stored drive ratio is a constant value, may be stored in a memory of circuit 200. For example, the stored drive ratio can be stored in one-time programmable (OTP) memory of circuit 200. In one embodiment, the quality factor ratio is calculated according to equation (2), as follows:

$$\text{Quality Factor Ratio} = \frac{DriveRatio}{DriveRatio_{Stored}} \quad (2)$$

Where the DriveRatio is the drive ratio received from divider circuit 235 and the DriveRatio$_{Stored}$ is the stored drive ratio.

Gain circuit 245 further includes a scale factor and is configured to calculate an offset magnitude based on the scale factor and the quality factor ratio. In one embodiment, the scale factor is a stored value of an initial quadrature of the MEMS resonator. Gain circuit 245 is configured to compensate for an effect of a change in the quality factor of the MEMS gyroscope based at least in part on the percentage change in quality factor. In accordance with the present embodiment, gain circuit outputs a scaled quality factor ratio, also referred to herein as the offset magnitude, to adder circuit 270. In one embodiment, the offset magnitude is calculated according to equation (3), as follows:

Offset Magnitude=Quality Factor Ratio*Scale Factor (3)

Returning to sense path 218, MEMS gyroscope 215 outputs a sense path signal to sense path amplifier 255. Multiplier circuit 260 receives the sense path signal and the drive path output from demodulator 250, and outputs the sense path output signal. Analog to digital converter 265 digitizes the sense path output signal.

Adder circuit 270 receives the digitized sense path output signal and adds the offset magnitude calculated by drive ratio offset compensation circuit 210. The compensated digitized sense path output signal is thus compensated for any offset change that results from a change in quality factor. Accordingly, the described embodiment provides a circuit 200 of FIG. 2 that compensates for changes in quality factor of the MEMS gyroscope 215.

Example Circuit with Offset Compensation Using Drive Amplitude

Figure 3:
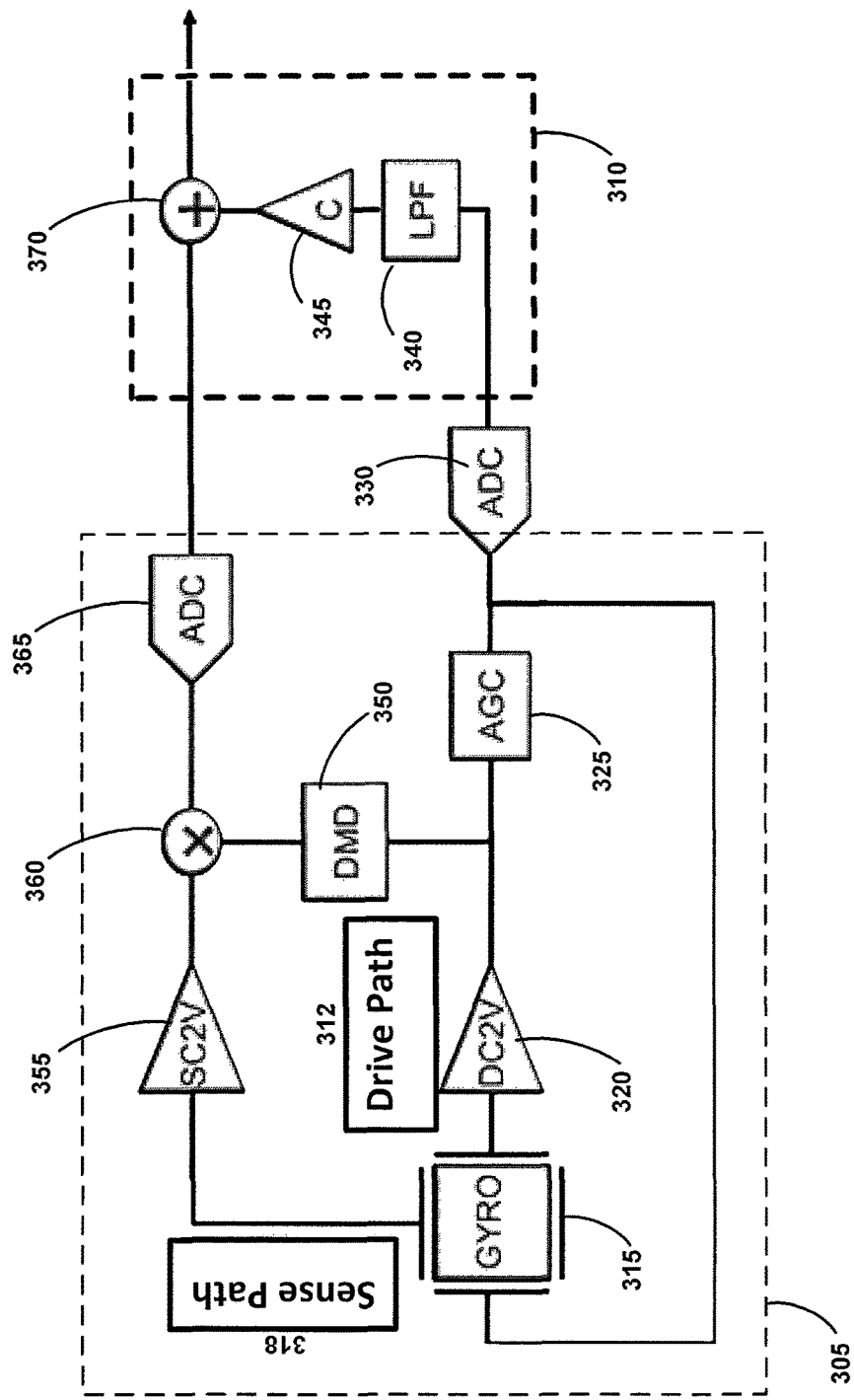
FIG. 3 illustrates a block diagram of example circuit with offset compensation using drive amplitude, according to some embodiments.

FIG. 3 illustrates a block diagram of example circuit 300 with offset compensation using drive amplitude, according to some embodiments. For example, sensor processing unit 170 of FIG. 1, may include MEMS gyroscope circuit with drive ratio amplitude compensation 300 as a sensor 178 (e.g., sensor 178-1 may be a circuit 300). As illustrated in FIG. 3, circuit 300 includes a MEMS gyroscope circuit 305 and a drive ratio amplitude compensation circuit 310.

It should be appreciated that circuit 300 operates in a similar manner as circuit 200 of FIG. 2. However, circuit 300 operates under the assumption that amplitude gain control 325 is robust, resulting in a substantially fixed or constant drive signal output. Accordingly, as the drive signal output is presumed constant, there is no need to take a ratio of drive signals.

In various embodiments, MEMS gyroscope circuit 305 is configured to provide multiple axis gyroscopic sensing for use in a variety of applications using angular motion. As described herein, MEMS gyroscope 315 is configured to provide a sense signal over sense path 318 and drive signal over drive path 312. Using measurements of the components in drive path 312, a change in quality factor of MEMS gyroscope 315 can be estimated. This estimated change in quality factor can be used to compensate for offset change by digitally modifying the signal in sense path 318.

MEMS gyroscope 315 is coupled with drive-sense amplifier (DC2V) 320, and provides a gyroscope drive signal (e.g., the drive output) to drive-sense amplifier 320. MEMS gyroscope 315 maintains an oscillation, and drive-sense amplifier 320 is configured to sense the amplitude of the oscillation of MEMS gyroscope 315. The output signal from drive-sense amplifier 320 is also referred to herein as the drive output. The output of drive-sense amplifier 320 is coupled to amplitude gain control (AGC) 325 and demodulator 350. Amplitude gain control 325 receives the drive output from drive-sense amplifier 320, and outputs a drive input signal, also referred to as the drive amplitude signal and drive voltage. The drive amplitude signal is fed back into MEMS gyroscope 315, in maintaining oscillation, and is fed into analog to digital converter 330.

In one embodiment, the digitized drive amplitude signal is passed through low pass filter 340 to minimize signal noise of the digitized drive amplitude signal.

Gain circuit 345 receives the digitized drive amplitude signal, and is configured to calculate a quality factor ratio of the digitized drive amplitude signal to a stored drive amplitude signal of MEMS gyroscope 315. The quality factor ratio is indicative of a percentage change in a quality factor of MEMS gyroscope 315. In one embodiment, the stored drive amplitude signal is a trim value determined upon fabrication of MEMS gyroscope 315. It should be appreciated that the stored drive amplitude signal is a constant value, and may be stored in a memory of circuit 300. For example, the stored drive amplitude signal can be stored in OTP memory of circuit 300. In one embodiment, the quality factor ratio is calculated according to equation (4), as follows:

$$\text{Quality Factor Ratio} = \frac{\text{Drive Amplitude Signal}}{\text{Drive Amplitude Signal}_{Stored}} \quad (4)$$

Where the Drive Amplitude Signal is the digitized drive amplitude signal received from amplitude gain control 325 and the Drive Amplitude Signal$_{Stored}$ is the stored drive amplitude signal.

In one embodiment, gain circuit 345 further includes a scale factor and is configured to calculate an offset magnitude based on the scale factor and the quality factor ratio. In one embodiment, the scale factor is a stored value of an initial quadrature of the MEMS resonator. Gain circuit 345 is configured to compensate for an effect of a change in the quality factor of the MEMS gyroscope based at least in part on the percentage change in quality factor. In accordance with the present embodiment, gain circuit outputs a scaled quality factor ratio, also referred to herein as the offset magnitude, to adder circuit 370. In one embodiment, the offset magnitude is calculated according to equation (3), as illustrated above.

Returning to sense path 318, MEMS gyroscope 315 outputs a sense path signal to sense path amplifier 355. Multiplier circuit 360 receives the sense path signal and the drive path output from demodulator 350, and outputs the sense path output signal. Analog to digital converter 365 digitizes the sense path output signal.

Adder circuit 370 receives the digitized sense path output signal and adds the offset magnitude calculated by drive amplitude offset compensation circuit 310. The compensated digitized sense path output signal is thus compensated for any offset change that results from a change in quality factor. Accordingly, the described embodiment provides a sense signal of circuit 300 of FIG. 3 that compensates for changes in quality factor of the MEMS gyroscope 315.

Example Circuit with Phase Error Compensation Using Drive Ratio

Figure 4:
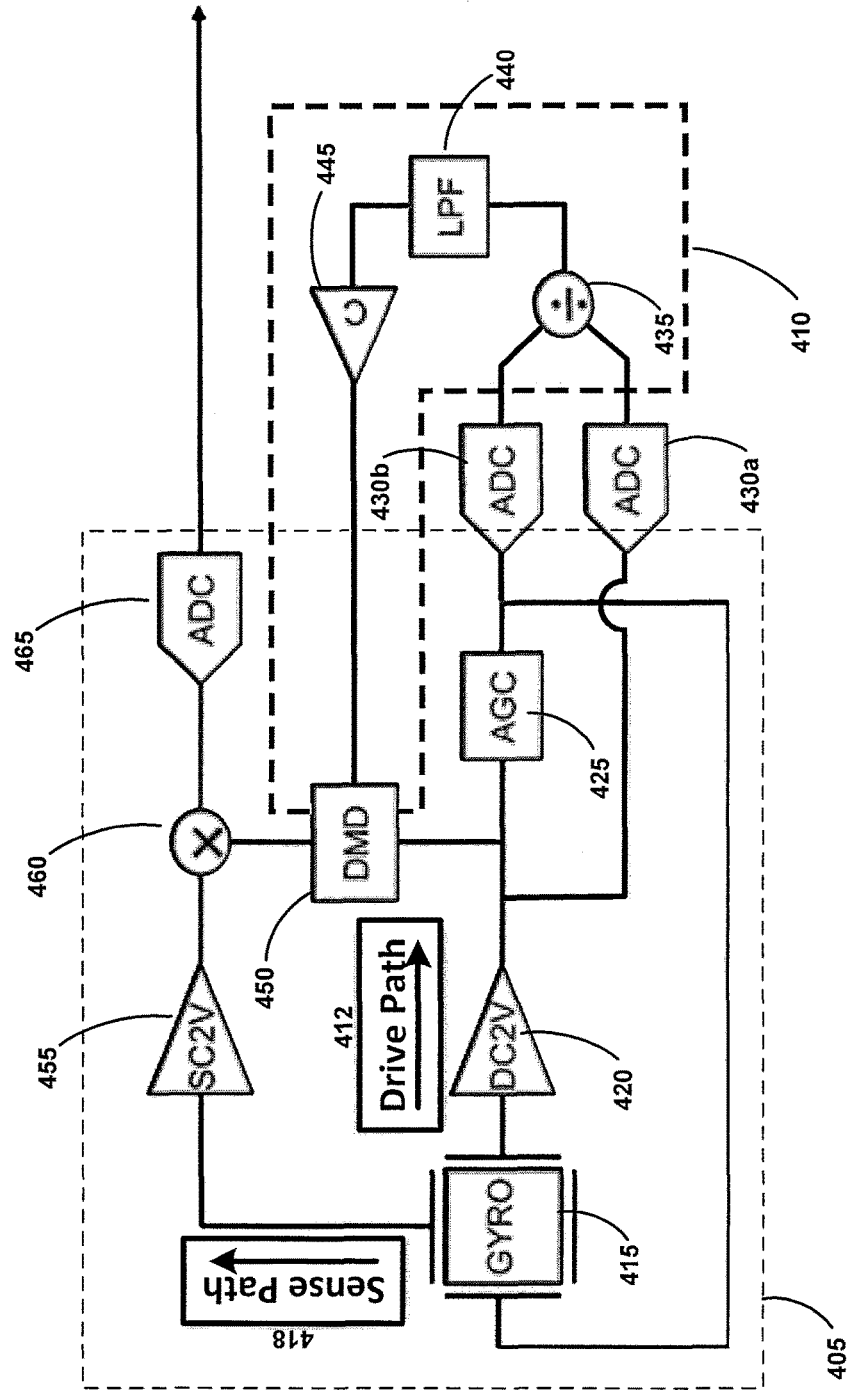
FIG. 4 illustrates a block diagram of example circuit with phase error compensation using drive ratio, according to some embodiments.

FIG. 4 illustrates a block diagram of example circuit 400 with phase error compensation using drive ratio, according to some embodiments. For example, sensor processing unit 170 of FIG. 1, may include circuit 400 as a sensor 178 (e.g., sensor 178-1 may be a circuit 400). As illustrated in FIG. 4, circuit 400 includes a MEMS gyroscope circuit 405 and a phase error compensation circuit 410.

As described herein, MEMS gyroscope 415 is configured to provide a sense signal over sense path 418 and drive signal over drive path 412. Using measurements of the components in drive path 412, a change in quality factor of MEMS gyroscope 415 can be estimated. This estimated change in quality factor can be used to compensate for offset change by modifying the phase of demodulator 450 to eliminate phase error.

MEMS gyroscope 415 is coupled with drive-sense amplifier (DC2V) 420, and provides a gyroscope drive signal (e.g., the drive output) to drive-sense amplifier 420. MEMS gyroscope 415 maintains an oscillation, and drive-sense amplifier 420 is configured to sense the amplitude of the oscillation of MEMS gyroscope 415. The output signal from drive-sense amplifier 420 is also referred to herein as the drive output. The output of drive-sense amplifier 420 is coupled to amplitude gain control (AGC) 425, analog to digital converter (ADC) 430a, and demodulator 450. Amplitude gain control 425 receives the drive output from drive-sense amplifier 420, and outputs a drive input signal, also referred to herein as the drive voltage. The drive input signal is fed back into MEMS gyroscope 415, in maintaining oscillation, and is fed into analog to digital converter 430b.

As described herein, analog to digital converters 430a and 430b receive a drive output signal and a drive input signal, respectively. However, it should be appreciated that a single analog to digital converter can be used for receiving and digitizing the drive input signal and the drive output signal by multiplexing the signals. Accordingly, the operations of analog to digital converters 430a and 430b may refer to the multiplexed operations of a single analog to digital converter. Analog to digital converter 430a is configured to digitize the drive output signal and analog to digital converter 430b is configured to digitize the drive input signal.

Divider circuit 435 is coupled to analog to digital converters 430a and 430b, and is configured to calculate a ratio of the digitized drive input signal to the digitized drive output signal, resulting in the drive ratio. The drive ratio provides an estimation of the quality factor of MEMS gyroscope 415. In one embodiment, the drive ratio is calculated according to equation (1), as illustrated above.

In one embodiment, the drive ratio signal is passed through low pass filter 440 to minimize signal noise of the drive ratio signal.

Gain circuit 445 receives the drive ratio signal, and is configured to calculate a quality factor ratio of the drive ratio received from divider circuit 435 to a stored drive ratio of MEMS gyroscope 415. The quality factor ratio is indicative of a percentage change in a quality factor of MEMS gyroscope 415. In one embodiment, the stored drive ratio is a trim value determined upon fabrication of MEMS gyroscope 415. It should be appreciated that the stored drive ratio is a constant value, may be stored in a memory of circuit 400. For example, the stored drive ratio can be stored in one-time programmable (OTP) memory of circuit 400. In one embodiment, the quality factor ratio is calculated according to equation (2), as described above.

Gain circuit 445 is configured to compensate for an effect of a change in the quality factor of the MEMS gyroscope based at least in part on the percentage change in quality factor. The quality factor ratio is fed into demodulator 450 to adjust the phase of demodulator 450 based on the magnitude of the quality factor ratio. The phase of demodulator 450 is adjusted to compensate for any offset change that results from a change in quality factor. Demodulator 450 receives the quality factor ratio calculated by phase error compensation circuit 410 and adjusts the phase of the demodulator accordingly.

Returning to sense path 418, MEMS gyroscope 415 outputs a sense path signal to sense path amplifier 455. Multiplier circuit 460 receives the sense path signal and the drive path output from demodulator 450, and outputs the sense path output signal. Analog to digital converter 465 digitizes the sense path output signal. Accordingly, the described embodiment provides a circuit 400 that compensates for changes in quality factor of the MEMS gyroscope 415.

Example Circuit with Phase Error Compensation Using Drive Amplitude

Figure 5:
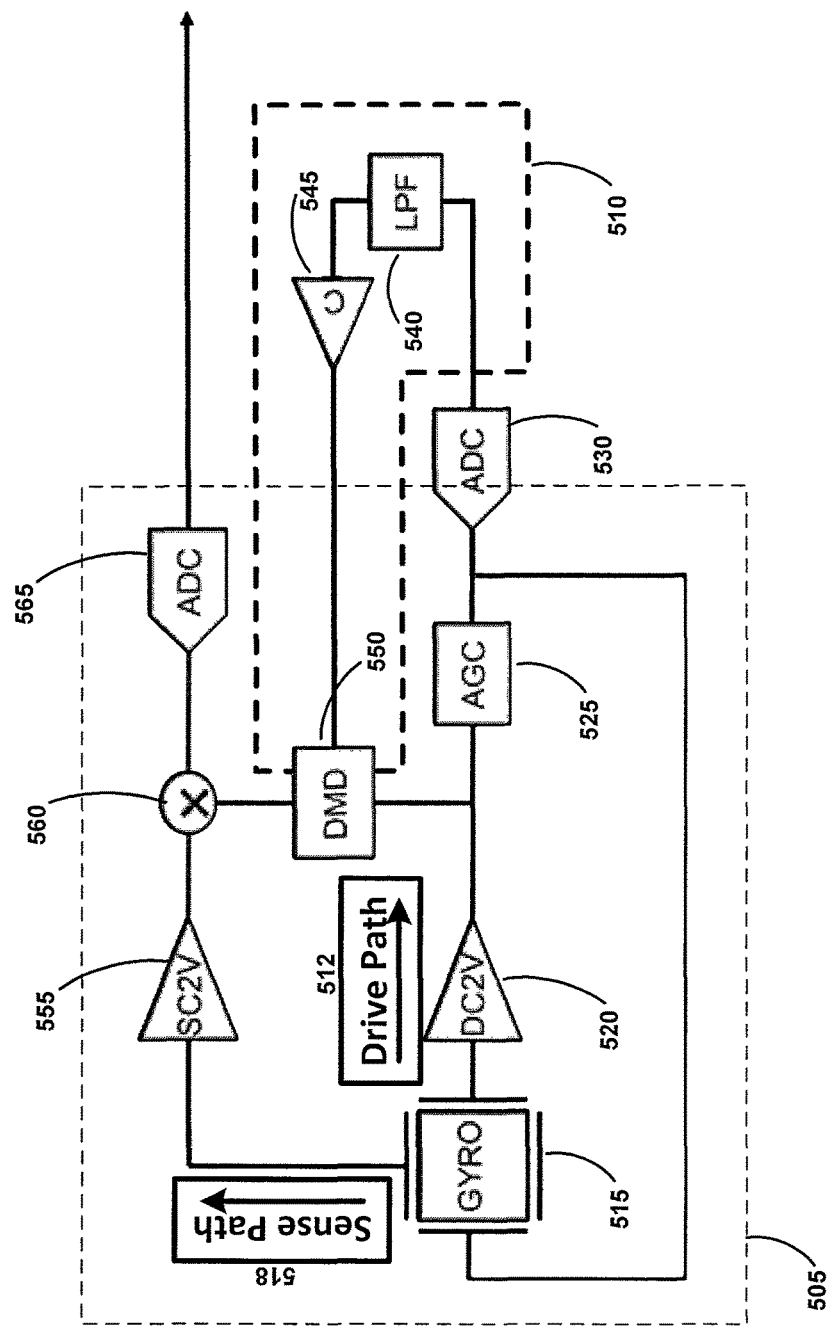
FIG. 5 illustrates a block diagram of example circuit with phase error compensation using drive amplitude, according to some embodiments.

FIG. 5 illustrates a block diagram of example circuit 500 with phase error compensation using drive amplitude, according to some embodiments. For example, sensor processing unit 170 of FIG. 1, may include circuit 500 as a sensor 178 (e.g., sensor 178-1 may be a circuit 500). As illustrated in FIG. 5, circuit 500 includes a MEMS gyroscope circuit 505 and a phase error compensation circuit 510.

It should be appreciated that circuit 500 operates in a similar manner as circuit 400 of FIG. 4. However, circuit 500 operates under the assumption that amplitude gain control 525 is robust, resulting in a substantially fixed or constant drive signal output. Accordingly, as the drive signal output is presumed constant, there is no need to take a ratio of drive signals.

In various embodiments, MEMS gyroscope circuit 505 is configured to provide multiple axis gyroscopic sensing for use in a variety of applications using angular motion. As described herein, MEMS gyroscope 515 is configured to provide a sense signal over sense path 518 and drive signal over drive path 512. Using measurements of the components in drive path 512, a change in quality factor of MEMS gyroscope 515 can be estimated. This estimated change in quality factor can be used to compensate for offset change by modifying the phase of demodulator 550 to eliminate phase error.

MEMS gyroscope 515 is coupled with drive-sense amplifier (DC2V) 520, and provides a gyroscope drive signal (e.g., the drive output) to drive-sense amplifier 520. MEMS gyroscope 515 maintains an oscillation, and drive-sense amplifier 520 is configured to sense the amplitude of the oscillation of MEMS gyroscope 515. The output signal from drive-sense amplifier 520 is also referred to herein as the drive output. The output of drive-sense amplifier 520 is coupled to amplitude gain control (AGC) 525 and demodulator 550. Amplitude gain control 525 receives the drive output from drive-sense amplifier 520, and outputs a drive amplitude signal, also referred to herein as the drive voltage. The drive amplitude signal is fed back into MEMS gyroscope 515, in maintaining oscillation, and is fed into analog to digital converter 530.

In one embodiment, the drive ratio signal is passed through low pass filter 540 to minimize signal noise of the drive amplitude signal.

Gain circuit 545 receives the digitized drive amplitude signal, and is configured to calculate a quality factor ratio of the digitized drive amplitude signal to a stored drive amplitude signal of MEMS gyroscope 515. The quality factor ratio is indicative of a percentage change in a quality factor of MEMS gyroscope 515. In one embodiment, the stored drive amplitude signal is a trim value determined upon fabrication of MEMS gyroscope 515. It should be appreciated that the stored drive amplitude signal is a constant value, and may be stored in a memory of circuit 500. For example, the stored drive amplitude signal can be stored in OTP memory of circuit 500. In one embodiment, the quality factor ratio is calculated according to equation (4), as described above.

Gain circuit 545 is configured to compensate for an effect of a change in the quality factor of the MEMS gyroscope based at least in part on the percentage change in quality factor. The quality factor ratio is fed into demodulator 550 to adjust the phase of demodulator 550 based on the magnitude of the quality factor ratio. The phase of demodulator 550 is adjusted to compensate for any offset change that results from a change in quality factor. Demodulator 550 receives the quality factor ratio calculated by phase error compensation circuit 510 and adjusts the phase of the demodulator accordingly.

Returning to sense path 518, MEMS gyroscope 515 outputs a sense path signal to sense path amplifier 555. Multiplier circuit 560 receives the sense path signal and the drive path output from demodulator 550, and outputs the sense path output signal. Analog to digital converter 565 digitizes the sense path output signal. Accordingly, the described embodiment provides a circuit 500 that compensates for changes in quality factor of the MEMS gyroscope 515.

Example Methods for Open-Loop Compensation of a MEMS Gyroscope

FIGS. 6 through 9 illustrate flow diagrams of example methods for open-loop compensation of a MEMS gyroscope. For purposes of illustration, during the description of the flow diagrams of FIGS. 6 through 9, reference will be made to elements and/or components of FIGS. 2 through 5. It is appreciated that in some embodiments, the procedures may be performed in a different order than described, that some of the described procedures may not be performed, and/or that one or more additional procedures to those described may be performed. It is further appreciated that one or more procedures described the flow diagrams of FIGS. 6 through 9 may be implemented in hardware, or a combination of hardware with firmware and/or software.

Figure 6:
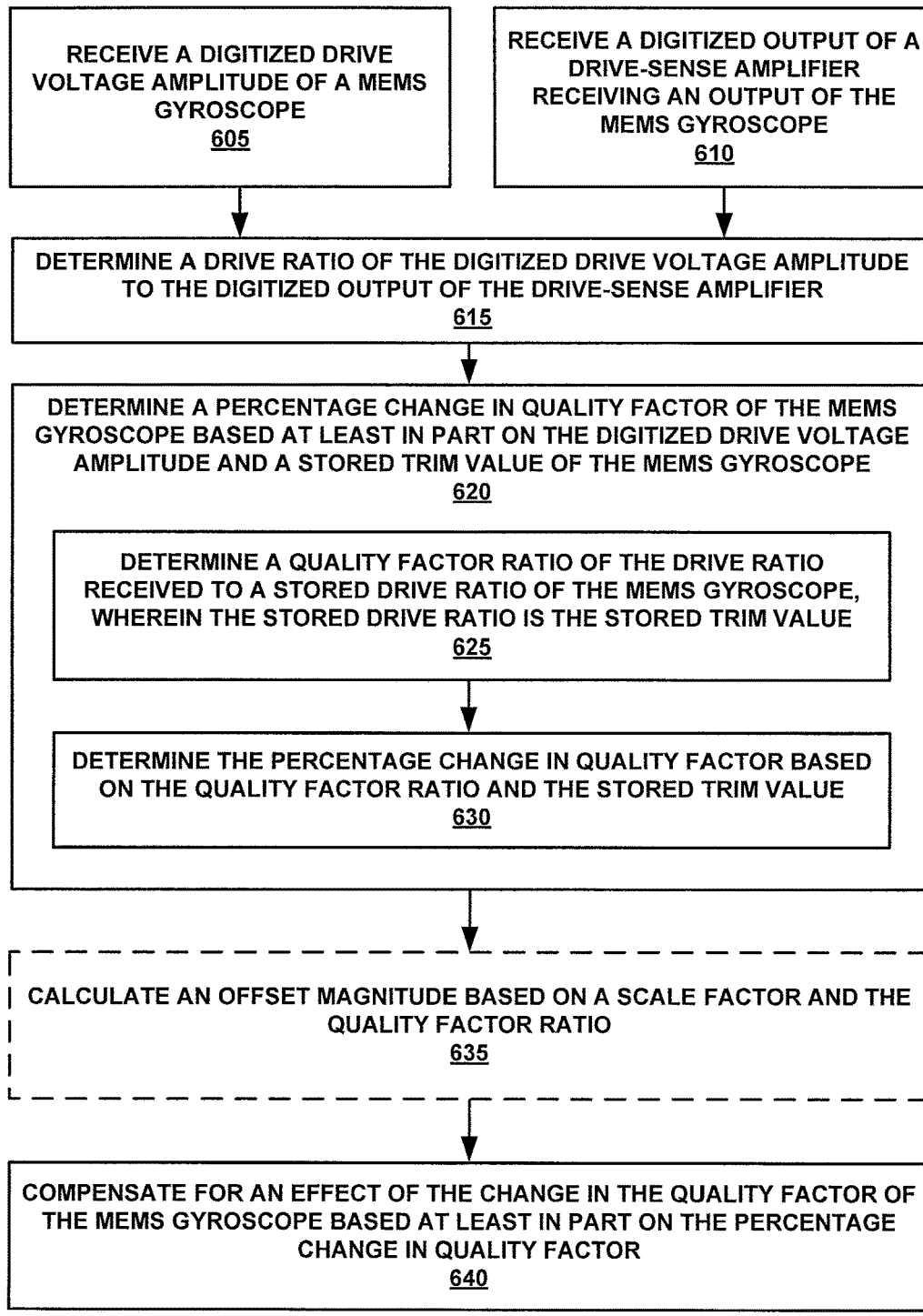
FIG. 6 illustrates a flow diagram of a method for open-loop compensation of a MEMS gyroscope in which a drive ratio is used, according to some embodiments.

FIG. 6 illustrates a flow diagram 600 of a method for open-loop compensation of a MEMS gyroscope in which a drive ratio is used. For purposes of illustration, flow diagram 600 may make reference to elements and/or components of FIGS. 2 and 4.

At procedure 605 of flow diagram 600, a digitized drive voltage amplitude of a MEMS gyroscope is received. It should be appreciated that the digitized drive voltage amplitude may also be referred to as a drive amplitude signal, an input signal, or a digitized input of a drive signal. At procedure 610, a digitized output of a drive-sense amplifier receiving an output of the MEMS gyroscope is received. It should be appreciated that the digitized output may also be referred to herein as a digitized output of a drive-sense amplifier. In one embodiment, the digitized drive voltage amplitude and the digitized output are received at divider circuit 235 or divider circuit 435.

At procedure 615, a drive ratio of the digitized drive voltage amplitude to the digitized output of the drive-sense amplifier is calculated. In one embodiment, the drive ratio is calculated at divider circuit 235 or divider circuit 435. The drive ratio provides an estimation of the quality factor of MEMS gyroscope 215 or 415.

At procedure 620, a percentage change in quality factor of the MEMS gyroscope is determined based at least in part on the digitized drive voltage amplitude and a stored trim value of the MEMS gyroscope. In one embodiment, the percentage change in quality factor is determined at gain circuit 245 or 445. In one embodiment, as shown at procedure 625, a quality factor ratio of the drive ratio received to a stored drive ratio of the MEMS gyroscope is determined, wherein the stored drive ratio is the stored trim value. At procedure 630, the percentage change in quality factor is determined based on the quality factor ratio and the stored trim value.

In one embodiment, as shown at procedure 635, an offset magnitude based on a scale factor and the quality factor ratio (as determined at procedure 625) is calculated. In one embodiment, the offset magnitude is determined at gain circuit 245 or 445. It should be appreciated that procedure 635 is optional. As will be explained further below, the offset magnitude as described herein is only used to provide offset compensation and is not used to provide direct phase error correction.

At procedure 640, an effect of the change in the quality factor of the MEMS gyroscope is compensated for based at least in part on the percentage change in quality factor. In one embodiment, as described in accordance with flow diagram 800 of FIG. 8, an offset magnitude is added to a sense path of the MEMS gyroscope, wherein the offset magnitude is based on the percentage change in quality factor and a scale factor. In another embodiment, as described in accordance with flow diagram 900 of FIG. 9, the percentage change in quality factor is provided to a demodulator, and the phase of the demodulator is adjusted based on the percentage change in quality factor.

FIG. 7 illustrates a flow diagram 700 of a method for open-loop compensation of a MEMS gyroscope in which a drive amplitude is used. For purposes of illustration, flow diagram 700 may make reference to elements and/or components of FIGS. 3 and 5.

At procedure 705 of flow diagram 700, a digitized drive voltage amplitude of a MEMS gyroscope is received. It should be appreciated that the digitized drive voltage amplitude may also be referred to as a drive amplitude signal, an input signal, or a digitized input of a drive signal. In one embodiment, the digitized drive voltage amplitude is received at gain circuit 345 or gain circuit 545.

At procedure 710, a percentage change in quality factor of the MEMS gyroscope is determined based on the digitized drive voltage amplitude and an initial digitized drive voltage amplitude of the MEMS gyroscope, wherein the initial digitized drive voltage amplitude of the MEMS gyroscope is the stored trim value. In one embodiment, the percentage change in quality factor is determined at gain circuit 345 or 545.

In one embodiment, as shown at procedure 715, an offset magnitude based on a scale factor and the percentage change in quality factor is calculated. In one embodiment, the offset magnitude is determined at gain circuit 345 or 545. It should be appreciated that procedure 715 is optional. As will be explained further below, the offset magnitude as described herein is only used to provide offset compensation and is not used to provide direct phase error correction.

At procedure 720, an effect of the change in the quality factor of the MEMS gyroscope is compensation for based at least in part on the percentage change in quality factor. In one embodiment, as described in accordance with flow diagram 800 of FIG. 8, an offset magnitude is added to a sense path of the MEMS gyroscope, wherein the offset magnitude is based on the percentage change in quality factor and a scale factor. In another embodiment, as described in accordance with flow diagram 900 of FIG. 9, the percentage change in quality factor is provided to a demodulator, and the phase of the demodulator is adjusted based on the percentage change in quality factor.

FIG. 8 illustrates a flow diagram 800 of a method for adding an offset magnitude to a sense path of a MEMS gyroscope, according to some embodiments. It should be appreciated that procedure 640 of FIG. 6 and/or procedure 720 of FIG. 7 may be performed according to the procedures of flow diagram 800. For purposes of illustration, flow diagram 900 may make reference to elements and/or components of FIGS. 2 and 3.

In one embodiment, as shown at procedure 805 of flow diagram 800, an offset magnitude is added to a sense path of the MEMS gyroscope, wherein the offset magnitude is based on the percentage change in quality factor and a scale factor. In one embodiment, the offset magnitude is added to the sense path at adder circuit 270 or added circuit 370.

FIG. 9 illustrates a flow diagram of a method for adjusting a phase of a demodulator, according to some embodiments. It should be appreciated that procedure 640 of FIG. 6 and/or procedure 720 of FIG. 7 may be performed according to the procedures of flow diagram 900. For purposes of illustration, flow diagram 900 may make reference to elements and/or components of FIGS. 4 and 5.

In one embodiment, as shown at procedure 905 of flow diagram 900, the percentage change in quality factor is provided to a demodulator. At procedure 910, the phase of the demodulator is adjusted based on the percentage change in quality factor. In one embodiment, the phase of demodulator 450 or demodulator 550 is adjusted.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A circuit comprising:
a microelectromechanical (MEMS) gyroscope; and
a gain circuit coupled with the MEMS gyroscope, the gain circuit configured to receive a digitized drive signal based at least in part on a digitized drive voltage amplitude of the MEMS gyroscope, the gain circuit configured to determine a percentage change in quality factor of the MEMS gyroscope based at least in part on the digitized drive signal and a stored trim value of the MEMS gyroscope, and the gain circuit configured to compensate for an effect of a change in the quality factor of the MEMS gyroscope based at least in part on the percentage change in quality factor.

2. The circuit of claim 1, wherein the stored trim value is an initial digitized drive voltage amplitude of the MEMS gyroscope.

3. The circuit of claim 2, wherein the gain circuit further comprises a scale factor and is further configured to calculate an offset magnitude based on the scale factor and the percentage change in quality factor.

4. The circuit of claim 3, wherein the scale factor is a stored value of an initial quadrature of the MEMS gyroscope.

5. The circuit of claim 3, further comprising:
an adder circuit coupled with the gain circuit and a sense path of the MEMS gyroscope and configured to add the offset magnitude to the sense path of the MEMS gyroscope.

6. The circuit of claim 1, further comprising:
a demodulator coupled with the gain circuit and a drive path of the MEMS gyroscope and configured to adjust a phase of the demodulator based on the percentage change in quality factor.

7. The circuit of claim 1, further comprising:
a divider circuit coupled to the MEMS gyroscope and the gain circuit and configured to calculate a drive ratio of the digitized drive voltage amplitude to a digitized output of a drive-sense amplifier receiving an output of the MEMS gyroscope, wherein the digitized drive signal received at the gain circuit is the drive ratio.

8. The circuit of claim 7, wherein the stored trim value is an initial drive ratio of the MEMS gyroscope, and wherein the gain circuit is configured to determine the percentage change in quality factor of the MEMS gyroscope based on the drive ratio and the initial drive ratio.

9. The circuit of claim 8, wherein the gain circuit further comprises a scale factor and is further configured to calculate an offset magnitude based on the scale factor and the percentage change in quality factor.

10. The circuit of claim 9, wherein the scale factor is a stored value of an initial quadrature of the MEMS gyroscope.

11. The circuit of claim 9, further comprising:
an adder circuit coupled with the gain circuit and a sense path of the MEMS gyroscope and configured to add the offset magnitude to the sense path of the MEMS gyroscope.

12. The circuit of claim 7, further comprising:
a demodulator coupled with the gain circuit and a drive path of the MEMS gyroscope and configured to adjust a phase of the demodulator based on the percentage change in quality factor.

13. The circuit of claim 1, further comprising:
a low pass filter coupled with an input of the gain circuit and configured to reduce noise of the digitized drive signal.

14. A compensating circuit for a microelectromechanical (MEMS) resonator, the circuit comprising:
a divider circuit configured to calculate a drive ratio of a digitized input of a drive signal of a MEMS resonator to a digitized output of a drive-sense amplifier receiving an output of the MEMS resonator; and
a gain circuit coupled with an output of the divider circuit and configured to calculate a quality factor ratio of the drive ratio received from the divider circuit to a stored drive ratio of the MEMS resonator, wherein the quality factor ratio is indicative of a change in a quality factor of the MEMS resonator.

15. The circuit of claim 14, wherein the MEMS resonator is a MEMS gyroscope.

16. The circuit of claim 14, further comprising:
a low pass filter coupled with an output of the divider circuit and an input of the gain circuit and configured to reduce noise of the drive ratio.

17. The circuit of claim 14, wherein the gain circuit further comprises a scale factor and is further configured to calculate an offset magnitude based on the scale factor and the quality factor ratio.

18. The circuit of claim 17, wherein the scale factor is a stored value of an initial quadrature of the MEMS resonator.

19. The circuit of claim 17, further comprising:
an adder circuit coupled with the gain circuit and a sense path of the MEMS resonator and configured for adding the offset magnitude to the sense path of the MEMS resonator.

20. The circuit of claim 14, further comprising:
a demodulator coupled with the gain circuit and a drive path of the MEMS resonator and configured to adjust a phase of the demodulator based on the quality factor ratio.

21. The circuit of claim 14, wherein the digitized output of the drive-sense amplifier is fixed, such that the drive ratio is based on the digitized input of the drive signal of the MEMS resonator.

* * * * *